(12) United States Patent
Haimi-Cohen (10) Patent No.: US 6,374,221 B1
(45) Date of Patent: Apr. 16, 2002

(54) AUTOMATIC RETRAINING OF A SPEECH RECOGNIZER WHILE USING RELIABLE TRANSCRIPTS

(75) Inventor: Raziel Haimi-Cohen, Springfield, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/337,229

(22) Filed: Jun. 22, 1999

(51) Int. Cl.[7] ............................................... G10L 15/14
(52) U.S. Cl. ...................................................... 704/256
(58) Field of Search ................................ 704/200, 251, 704/231, 240, 242, 256, 243, 247, 270.1, 270, 275, 250, 255, 239, 244, 252

(56) References Cited

U.S. PATENT DOCUMENTS

| | | | |
|---|---|---|---|
| 5,452,340 A | | 9/1995 | Haimi-Cohen ............... 379/67 |
| 5,579,436 A | * | 11/1996 | Chou et al. .................. 704/244 |
| 5,644,680 A | * | 7/1997 | Bielby et al. ............... 704/240 |
| 5,737,724 A | | 4/1998 | Atal et al. ................... 704/251 |
| 5,806,034 A | * | 9/1998 | Naylor et al. .............. 704/256 |
| 5,893,509 A | * | 4/1999 | Raman ........................ 704/256 |
| 5,960,393 A | * | 9/1999 | Cohrs et al. ............... 704/240 |
| 6,014,624 A | * | 1/2000 | Raman ........................ 704/243 |
| 6,092,045 A | * | 7/2000 | Stubley et al. ............. 704/254 |
| 6,134,527 A | * | 10/2000 | Meuniee et al. ........... 704/247 |
| 6,151,575 A | * | 11/2000 | Newman et al. ........... 704/260 |
| 6,182,037 B1 | * | 1/2001 | Maes ........................... 704/247 |
| 6,195,634 B1 | * | 2/2001 | Dudemaine ................. 704/231 |
| 6,226,612 B1 | * | 5/2001 | Srenger et al. ............. 704/256 |

FOREIGN PATENT DOCUMENTS

| | | | |
|---|---|---|---|
| EP | 0 746 129 A2 | 12/1996 | ............ H04M/1/00 |
| JP | 07283858 A | 10/1995 | ............ H04M/1/274 |
| JP | 09162966 A | 6/1997 | ............ H04M/1/27 |
| WO | WO 98/25393 | 6/1998 | ............ H04M/3/50 |
| WO | WO 98/28733 | 7/1998 | ............ G10L/5/00 |

OTHER PUBLICATIONS

AT&T 3050/3450 Cellular Telephone Owner's Manual, Voice Recognition Features, 1993.
Lawrence R. Rabiner, "A Tutorial on Hidden Markov Models and Selected Applications in Speech Recognition", Proceedings of the IEEE, vol. 77, No. 2, Feb. 1989.

* cited by examiner

Primary Examiner—Richemond Dorvil (57) ABSTRACT

Automatic retraining of a speech recognizer during its normal operation in conjunction with an electronic device responsive to the speech recognizer is addressed. In this retraining, stored trained models are retrained on the basis of recognized user utterances. Feature vectors, model state transitions, and tentative recognition results are stored upon processing and evaluation of speech samples of the user utterances. A reliable transcript is determined for later adaptation of a speech model, in dependence upon the user's successive behavior when interacting with the speech recognizer and the electronic device. For example, in a name dialing process, such a behavior can be manual or voice re-dialing of the same number or dialing of a different phone number, immediately aborting an established communication, or braking it after a short period of time. In dependence upon such a behavior, a transcript is select in correspondence to a user's first utterance or in correspondence to a user's second utterance, or both, or the tentative recognition result (or results) are determined to be uncertain and deemed not to be suitable for updating a model, or updating is performed with appropriate weighting to take into effect the level of uncertainty. Upon determination of a reliable transcript, a model adaptation is performed.

24 Claims, 7 Drawing Sheets

| FRAME | STATE OF PREVIOUS FRAME | | | BACK TRACKING |
|---|---|---|---|---|
| 1 | – | – | – | 1 |
| 2 | 1 | – | – | 1 |
| 3 | 1 | 1 | – | 1 |
| 4 | 1 | 2 | 2 | 1 |
| . | 1 | | | 1 |
| . | | 1 | | 2 |
| . | | 2 | | 2 |
| . | | | 2 | 3 |
| . | | | 3 | 3 |
| 10 | | | 3 | 3 |

FIG. 10

$$\underline{\mu} := \omega_1 \cdot \underline{\mu} + \omega_2 \cdot \text{estimate}(\underline{\mu})$$

AUTOMATIC RETRAINING OF A SPEECH RECOGNIZER WHILE USING RELIABLE TRANSCRIPTS

FIELD OF THE INVENTION

The present invention relates to advantageous aspects of an improved speech recognizer. More particularly, such a speech recognizer can be used for voice operated name or digit dialing in a telephone device such as a cellular or cordless phone, or also for voice controlled operation of the telephone device generally or any other suitable voice controlled device. The speech recognizer can be trained for speaker independent or speaker dependent operation. In case of a telephony system, the speech recognizer can also be incorporated at the network side of the system, in the network itself or at a particular service providing node of the network.

BACKGROUND OF THE INVENTION

The article "A Tutorial on Hidden Markov Models and Selected Applications in Speech Recognition", Laurence R. Rabiner, Proceedings of the IEEE, Vol. 77, No. 2, February 1989, pp. 257–286 discloses basic principles of speech recognition, and general implementations of speech recognizers for recognition of continuous speech, or for recognition of isolated words or clusters of connected words. This article is incorporated by reference herein in its entirety. Speech recognition of continuous speech, typically involving a large vocabulary of words, is a complicated process, whereas recognition of isolated words, used for small vocabulary word recognition in voice driven control of apparatuses, or, in telephony applications for name or digital dialing and/or control, for instance, is a much simpler process to be implemented.

In said article, methods are disclosed for modeling speech signals to be recognized into statistical models, and, after training of these models, for recognizing unknown speech signals by matching such unknown signals to the models and by taking a statistically most likely model as a recognition result. The recognition result can be used for many applications, including voice command driven operation of apparatuses and, in telephones, name dialing. As described in said article, the speech recognition process is based upon statistically matching feature vectors, representing samples of a speech signal to be recognized, with speech signal models. Such models are statistical models of speech signals, i.e., are models which characterize the statistical properties of the speech signals, e.g., in the form of so-called Hidden Markov Models, HMMs, as described in detail in said article.

Hidden Markov Models are probabilistic functions of so-called Markov chains of states, representing a real-world speech signal as a parametrical stochastic process, the parameters initially being obtained by training of the model using a succession of the same known utterance, for instance. In such a HMM, used in an isolated word speech recognizer, for instance, an observation representing a speech signal is a probabilistic function of the states of the Markov chain, i.e., the resulting model is a doubly embedded stochastic process with an underlying stochastic process that is not observable (hidden), but can only be observed through another set of stochastic processes that produce the sequence of observations. Observations can represent spectral and/or temporal characteristics of a speech signal. A spectral method for obtaining an observation sequence or feature vector sequence from speech samples is so-called LPC/Cepstral feature analysis, as described on page 227 of said article. Typically, a feature vector comprises some 25 different characteristics characterizing the speech signal to be recognized. In the speech recognizer, given an observation sequence, or vector, derived from an unknown input utterance, and the models, probabilities are computed for such an observation sequence as regards all models, i.e., scores are determined. The model with the best score, in terms of likelihood, is selected as a tentative recognition result, which can either be accepted or rejected. While determining scores, using a Viterbi algorithm, model state transitions are saved for later use in a back tracking process for determining a corresponding state sequence best explaining the observation sequence. For retraining or re-estimating the model, the observation sequence and the saved model state transitions are used. The models can be retrained during normal operation of a speech recognizer, i.e., based upon speech signals to be recognized and recognition transcripts. Thus, the models can be improved in a statistical sense so as to improve speech recognition. A transcript, sometimes called a label is the verbal content of an utterance, or an index designation of such a content.

In the AT&T Owner's Manual "AT&T 3050/3450 Cellular Telephone", pages 59–65, published 1993, Voice Recognition Features of a Voice Dialer are described, such as training the voice dialer before use, of both voice commands for operating the voice dialer and for constructing a voice dial name list.

In the PCT Patent Application WO 98/25393, a voice dialer is disclosed. A telephone directory of names and telephone numbers which a user frequently dials is maintained. A speech recognizer is used to select records from the directory. The speech recognizer performs similarity measurements by comparing confidence metrics derived from an input representation of a spoken utterance and from a previous representation stored in a record of the directory. As described on page 22, lines 5–14, the user's own dialing habits are used to improve selection of the desired record, and to organize and update a telephone directory. In this respect, the user's calling habits are registered by recording in a frequency field the number of times the user calls a particular number. Furthermore, adding and deleting of records is controlled by frequently prompting the user, to speak again or to cancel, for instance, so as to avoid possible errors in the telephone directory.

In other speech recognition systems, the reliability of the tentative recognition result, obtained by selecting the statistically most likely model in the matching process, is tested. If in a number of tests most or all tests are passed, the tentative recognition result, which is rejected otherwise, is accepted as the final recognition result. One known test is the testing of a so-called anti-model, an anti-model being a model which represents a recognition outcome which can easily be statistically confused with a model of interest. If in such a test the anti-model does not score significantly worse than the model of interest, a user input utterance under test is rejected. In some other systems, this step is optional, and the tentative recognition result becomes the final recognition result without any reliability testing.

Furthermore, as regards training of speech recognition models, it is well-known that in order to get good performance of a set of models, both for sets trained with utterances of many speakers, so-called speaker independent training, and for sets trained with utterances of an individual user, so-called speaker dependent training, the training set should be sufficiently large and preferably should include the conditions under which the models are to be used during normal operation of the speech recognizer, such conditions including ambient noise, transducer and channel distortion, the user's emotional state, and so on. In speaker independent training, the training set should include utterances from speakers having various pronunciations of a particular language. In practice, it is difficult to fulfill all of the above requirements. Collecting training sets for speaker independent training is expensive, tedious and time consuming. Collecting more than some two utterances per word for speaker dependent recognition is considered by many users as an imposition. Furthermore, the pronunciation of a single user may vary with time. Moreover, it is difficult to foresee all the different noise and channel conditions in which the speech recognizer will be used in practice, and to include such conditions in the training set. In addition, the emotional state of people training the system, while being requested to repeat words and sentences, is different from their emotional state when making a call.

In order to mitigate the above problems, some speech recognizers apply model adaptation in which a speech model is adapted or retrained using additional training speech material, obtained under normal operational conditions of the speech recognizer. Model adaptation has been used in voice dictation applications, in which the user's dictation input becomes the retraining material, and the recognized text, as modified by the user via a keyboard using standard text processor techniques, is used as a transcript, e.g. an index in a word table entry. A key point in this method is the fact that, after the user's editing, the text is a correct transcript of the user's utterance. If such a modification step, done by the user, is omitted, and the recognition results are used as the transcript, then, if the recognition results were wrong, the retraining process would degrade the models rather than improving them. Therefore, for effective retraining, it is essential to obtain a reliable transcript of the speech material to be used for retraining.

SUMMARY OF THE INVENTION

It is an object of the invention to provide a speech recognition method in which a reliable transcript of a user utterance is available when retraining a speech model during normal use of a speech recognizer.

It is another object of the invention to provide a speech recognition method in which weighting factors of model parameters and estimates of model parameters are selectable.

It is still another object of the invention to provide a speech recognizer for use in a telephone or in a network for voice dialing by a user of the telephone.

It is yet another object of the invention to provide a speech recognizer for use in a telephone for voice command purposes.

In accordance with one aspect of the invention, a method for automatic retraining of a speech recognizer during its normal operation is provided, in which speech recognizer a plurality of trained models is stored, the method comprising:
  a) extracting a first feature vector sequence from a sampled input stream of a first user utterance,
  b) statistically matching the first feature vector sequence with the stored models so as to obtain likelihood scores for each model, while storing model state transitions,
  c) identifying the model with the highest likelihood score as a first tentative recognition result,
  d) storing the first feature vector sequence and the first tentative recognition result,
  e) informing the user, upon acceptance of the first tentative recognition result, about the first tentative recognition result,
  f) determining from the user's behavior, when the user successively operates the speech recognizer, whether the first tentative recognition result was correct, and
  g) retraining a model corresponding to the first recognition result, using the stored first feature vector sequence, if the first tentative recognition result was correct.

In part, the invention is based upon the insight that speech recognition results themselves cannot be considered to be reliable. Had they been so, there would have been no need for adaptation. So, it was recognized that there was a need for a supervised adaptation based on the determination of a reliable transcript, whereby a tentative recognition result is accepted or rejected on the basis of the user's subsequent behavior.

A substantial advantage of this approach is that no or only minimal involvement on the part of the user is required. Moreover, a tentative recognition result which was first apparently rejected by the user, still gets a chance of being used to update a speech model, dependent on the subsequent behavior of the user upon the initial rejection. This leads to a great overall improvement of the speech models because of improvement of statistical recognition properties of the models. In terms of variance, this means that the variance of a model becomes larger so that an input utterance has a smaller chance of an unjustified rejection.

In another aspect, the method for automatic retraining of a speech recognizer preferably comprises weighted retraining of the model, a first weighting factor being applied to stored model parameters and a second weighting factor being applied to an estimate of the model parameters obtained from the first or second tentative recognition result. If many utterances have been applied for retraining already, the model parameters are given a much higher weighting factor than to the estimate used for updating the model. This weighting is done because the model is already closer to optimum so that no severe retraining is needed. Also, when uncertainty exists about a transcript because of an initial rejection of a recognition result, the estimate's weighting factor is given a lower weighting factor.

Preferably, for user independently trained and retrained models, such models contain a mixture of parameters describing joint probability distributions for each model. In a country with many dialects, use of such models greatly improves the chance of proper recognition.

The invention can advantageously be used for voice dialing or for voice command recognition in a telephone.

DESCRIPTION OF THE PREFERRED EMBODIMENT

Figure 1:
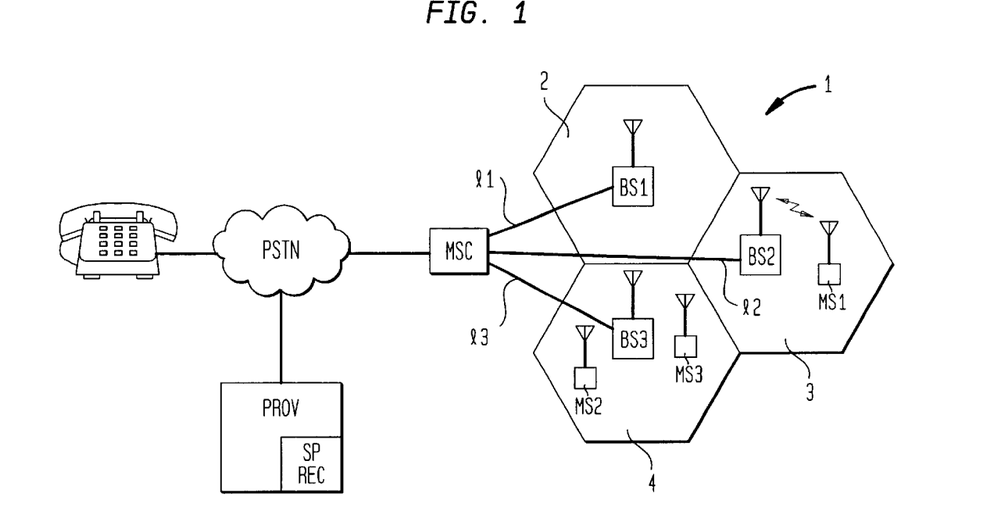
FIG. 1 schematically shows a cellular radio system.

FIG. 1 schematically shows a cellular radio system 1 comprising a number of radio zones 2, 3 and 4 with respective radio base stations BS1, BS2, and BS3 covering the radio zones 2, 3, and 4, respectively. Further shown are mobile radio stations MS1, MS2, and MS3 which are roaming through the cellular system 1. In the drawing, the mobile radio station MS1 is in radio communication with the radio base station BS2. The radio base stations BS1, BS2, and BS3 are coupled via land lines 11, 12, and 13 to a mobile switching center MSC forming a gateway to a public switched telephone network PSTN. Further shown are a wired phone TEL and a service provider PROV which can provide speech recognition services SPREC. Speech recognition in accordance with the invention can be implemented in separate devices such as the mobile stations MS1, MS2, and MS3, and the wired phone TEL, but may also be incorporated in the network, e.g., in the mobile switching center MSC, or by the service provider PROV.

Figure 2:
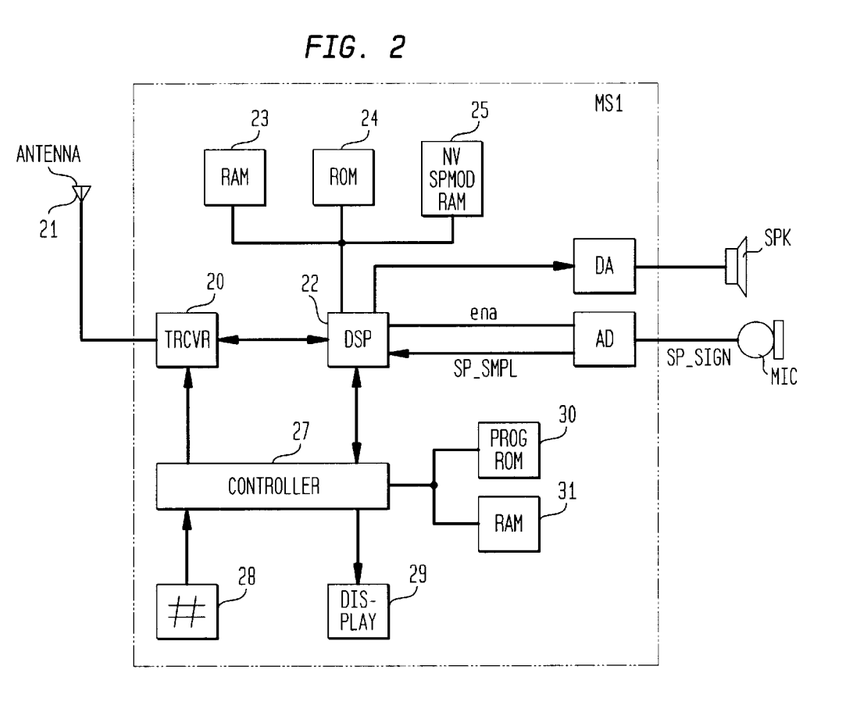
FIG. 2 is a block diagram of a mobile radio station for use in the cellular radio system of FIG. 1.

FIG. 2 is a block diagram of the mobile radio station MS 1 used in the cellular system 1. The mobile radio station MS1 comprises a transceiver 20, labeled TRCVR, which is coupled to an antenna 21 and to a digital signal processor 22, labeled DSP. The DSP is coupled to a RAM memory 23, a ROM memory 24, and a non-volatile RAM memory 25, labeled NV_RAM. In the non-volatile memory 25, trained speech models SPMOD, to be described further below, are stored. Training of speech models per se is well-known in the art, and is described in detail in the above referenced article by Rabiner. The speech models SPMOD are retrained in accordance with the method of the present invention. The mobile radio station MS1 further comprises a controller 27, a keypad 28, a display 29, program memory 30, labeled PROG ROM, and RAM memory 31. The controller controls the keypad 28, the display 29, which can be a liquid crystal display, for instance, the transceiver 20, the DSP 22, and other, non-shown functional blocks in the mobile radio station MS1 in a manner well known in the art. The DSP 22 is coupled to a speaker or ear piece SPK, via a digital to analog converter DA, and to a microphone MIC via an analog to digital converter AD. Via an enable/disable control line ena, the DSP 22 can enable the analog to digital converter AD to start sampling of a speech signal SP_SIGN.

Figure 3:
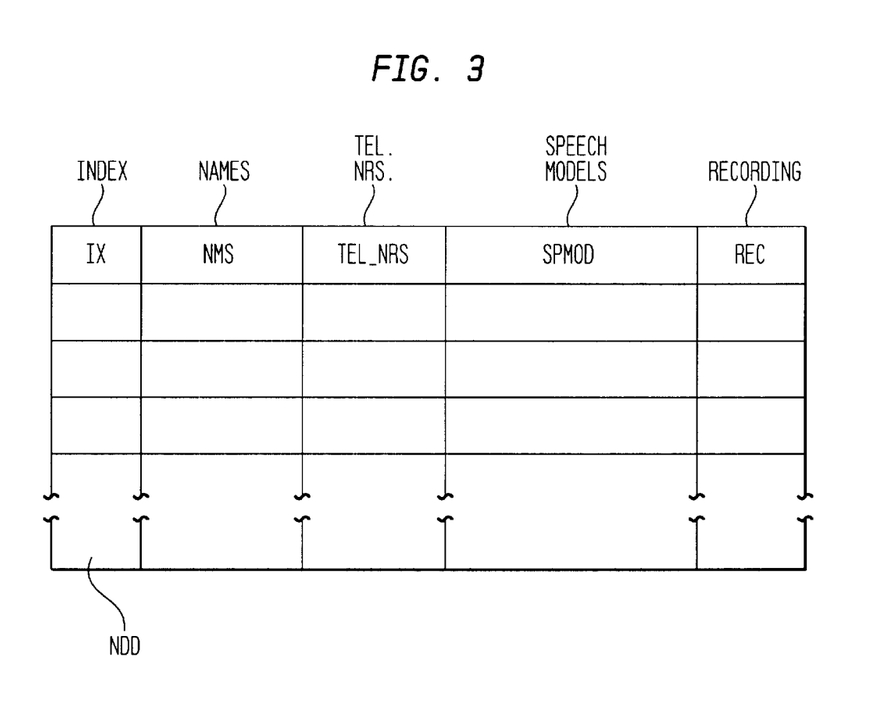
FIG. 3 illustrates a name dialing directory with associated speech model parameters.

FIG. 3 illustrates a name dialing directory NDD stored in the non-volatile RAM 25, with associated speech model parameters SPMOD. For each entry, the directory NDD comprises an index IX, names NMS, telephone numbers TEL_NRS, speech model parameters SPMOD, and a recording of an utterance REC of a user when using the speech recognition facility of the mobile radio station MS1. The recorded utterance REC is played back by the mobile radio station MS1 at a suitable point of time in the method of the invention.

Figure 4:
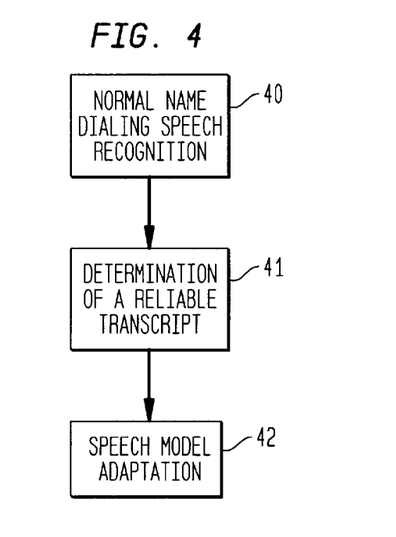
FIG. 4 shows a simple flowchart of a method according to the present invention.

FIG. 4 is a basic software flowchart of a method according to the present invention. In step 40, normal speech recognition for name dialing is performed, whereby in step 41 a reliable transcript is determined according to the invention. The reliable transcript is then used in step 42 for speech model adaptation, i.e., retraining of the speech models SPMOD.

Figure 5:
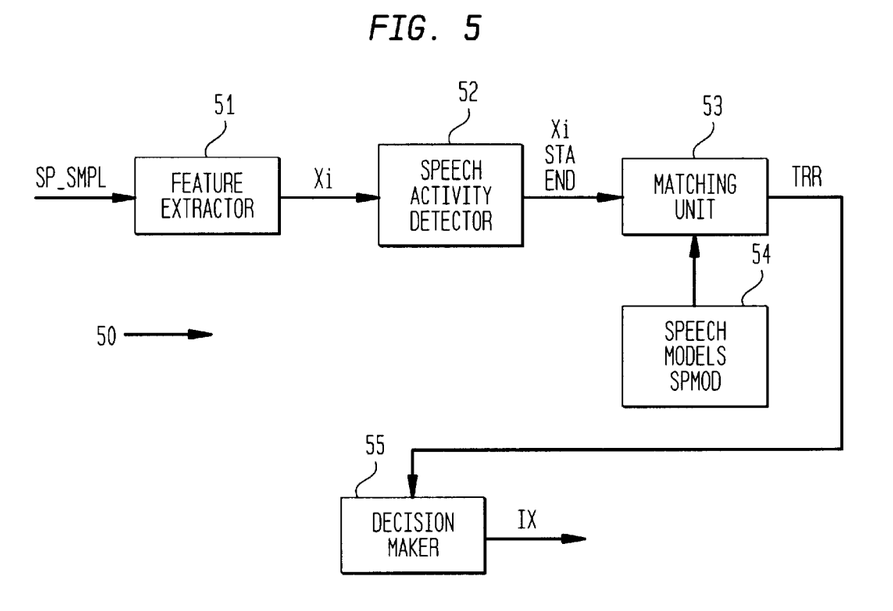
FIG. 5 is a block diagram of a speech recognizer according to the present invention.

FIG. 5 is a block diagram of a speech recognizer 50 according to the present invention. The speech recognizer 50 comprises a feature extractor 51 for extracting a sequence of feature vectors $X_i$, i=1,2, . . . , n, n being an integer, from a stream of speech samples SP_SMPL, corresponding to a user utterance, e.g., a spoken name or command, which are acquired with the analog to digital converter AD. A speech activity detector 52 for detecting a beginning and end point of the user's utterance is coupled to the feature extractor 51. If the beginning point of the user's utterance is detected, the matching unit 53 starts to match the acquired feature vectors $X_i$ with the stored speech models SPMOD. If a speech end point is detected, the recognizer 50 stops acquiring input samples and proceeds with its next processing steps. In this manner, unnecessary processing is avoided and also mistakes in the recognition process that might be caused by noise and clicks during the silent period. Moreover, due to a reduced processing effort, power savings and a reduced memory occupancy are achieved. The end point detector's output contains the feature vector sequence $X_i$, and further start and end point marks STA and END. A matching unit 53 for statistically matching an acquired feature vector sequence $X_i$ with the stored speech models SPMOD so as to obtain likelihood scores for each model is coupled to the speech activity detector 52. The matching unit 53 identifies the model with the highest likelihood as a tentative recognition result TRR and outputs the tentative recognition result TRR in the form of the index IX of an entry in the name dialing directory NDD comprising the speech models SPMOD. A decision maker 54 for accepting or rejecting the tentative recognition result is coupled to the matching unit 53. If the scores, or other parameters such as the duration of an utterance, determined by the matching unit 53 are unsatisfactory, the decision maker 55 rejects the tentative recognition result TRR. Otherwise, the decision maker 55 accepts the tentative recognition result TRR. Speech models 54, labeled SPMOD in the name dialing directory NDD, are trained prior to the recognition process using training sequences of feature vectors, training as such being well-known in the art. The speech models 54 are retrained in accordance with the method of the invention. In the embodiment given, the speech models are stored in the non-volatile memory 25, and the feature extractor 51, the speech activity detector 52, the matching unit 53, and the decision maker 55 are stored in the ROM 24 in the form of a stored program executable by the DSP 22. Intermediate and final computation results, and data are stored in the RAM 23.

Figure 6:
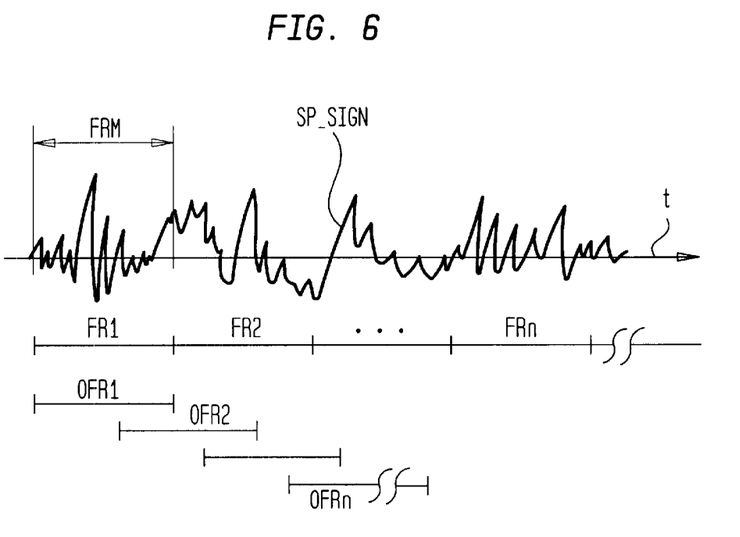
FIG. 6 shows a speech input signal.

FIG. 6 shows details of an exemplary speech input signal SP_SIGN. The feature extractor 51, operating on the stream of speech samples SP_SMPL, processes the samples on a frame FRM by frame basis, either a succession of non-overlapping frames FR1, FR2, . . . , FRn, or a succession of overlapping frames OFR1, OFR2, . . . , OFRn. Successive processing of the speech frames FR1, FR2, . . . , FRn preferably is a pipe-lined process, i.e., a process using successive intermediate data in successive processing of the frames and only storing intermediate computation results that are needed in a next successive processing step, rather than starting all matching computations after the acquisition of all the speech samples. Herewith, a substantive reduction is obtained, both in computation effort and memory occupancy. From each frame, the feature extractor 51 extracts a feature vector comprising many elements, such elements reflecting frequency contents, e.g., Cepstrum coefficients derived from LPC (Linear Prediction Coefficients) parameters, Δ-Cepstrum coefficients, and other parameters such as the energy of a signal comprised in a frame, the differential energy of signals in successive frames, and so on. With such parameters, the speech signal's characteristics are recorded. Feature extraction as such is well-known in the art, and is described on page 277 of said article of Rabiner, for instance, and will not be described in firther detail here.

Figure 7:
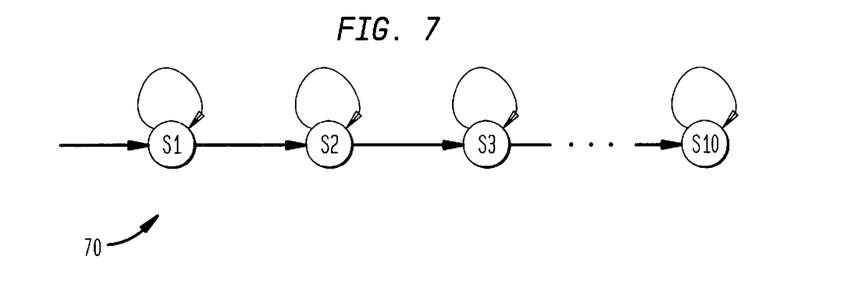
FIG. 7 shows a Markov model.

FIG. 7 shows a Markov model 70 for illustrating a speech model which can be used in the method of the invention, although other types of models may also be applied. The Markov model shown is a so-called Hidden Markov Model (HMM) of 10 states S1, S2, S3, . . . , S10. For the purpose of speech recognition, a so-called left-right model can be used, i.e., a model evolving from an initial state S1 to the final state S10 upon successive processing of the feature vectors $X_i$. The states S1, S2, . . . , S10 are represented by a probabilistic distribution for each state of observing a given feature vector in this state. The characteristics of each state of the HMM are derived from a training sequence of feature vectors and they do not necessarily correspond to distinct physical phenomena. However, conceptionally, they may be viewed as representing the states of a human's articulatory organ while speaking a word. An incoming speech signal changes its instantaneous characteristics in accordance with these articulatory states being represented but not being the same as the states S1, S2, . . . , S10 in the Markov model 70.

Figure 8:
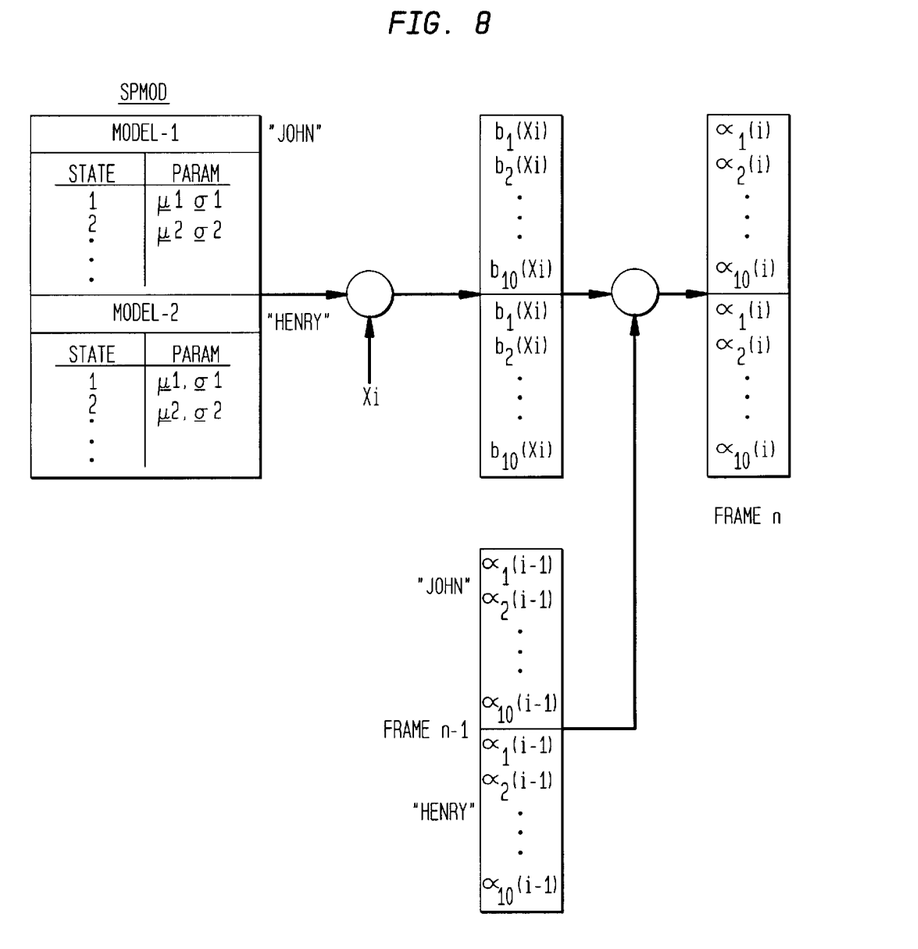
FIG. 8 illustrates likelihood computation of speech models with respect to states of the Markov model.

FIG. 8 illustrates likelihood computation of speech models with respect to the states S1, S2, . . . , S10 of the Markov model 70. For each frame, for each state of all the stored models SPMOD of trained user utterances, represented by statistical parameters, such as mean $\mu$ and variance $\sigma$ vectors, of the probability distributions associated with states of the Markov model 70, the LOG-likelihood of observing the corresponding feature vector in this state is computed, i.e., LOG-likelihoods $b_i(X_i)$, i=1, 2, . . . , n of a density distribution of the observation with respect to the density distribution of the state, or, stated otherwise, a measure is determined for the distance of the vector to the density distribution. Furthermore, the LOG-likelihoods $\alpha_k(i)$ are computed of the probability that at frame i the Markov model 70 has evolved to a state k, k being an integer in the range 1, 2, . . . , 10. Eventually, $\alpha_k(n)$ is obtained, e.g., n=10 as in the example the LOG-likelihood of the probability that at frame i the Markov model 70 has evolved to a state k. From all the above calculation results, scores are determined for each of the stored models, the model with the highest likelihood score becoming the tentative recognition result TRR. For reasons of simplicity, only two models are shown, models corresponding to the user's utterance of names "JOHN" and "HENRY". Detailed computation steps for obtained LOG-likelihood scores as such are well-known in the art, and are described in the paragraph "A. Continuous Observations Densities in HMMs", on page 267 of said article of Rabiner. The mathematical form of a probability density function to be used is known a priori, so that in name dialing directory NDD only the density's parameters, the mean and variance vectors $\mu$ and $\sigma$ need to be stored.

Figure 9:
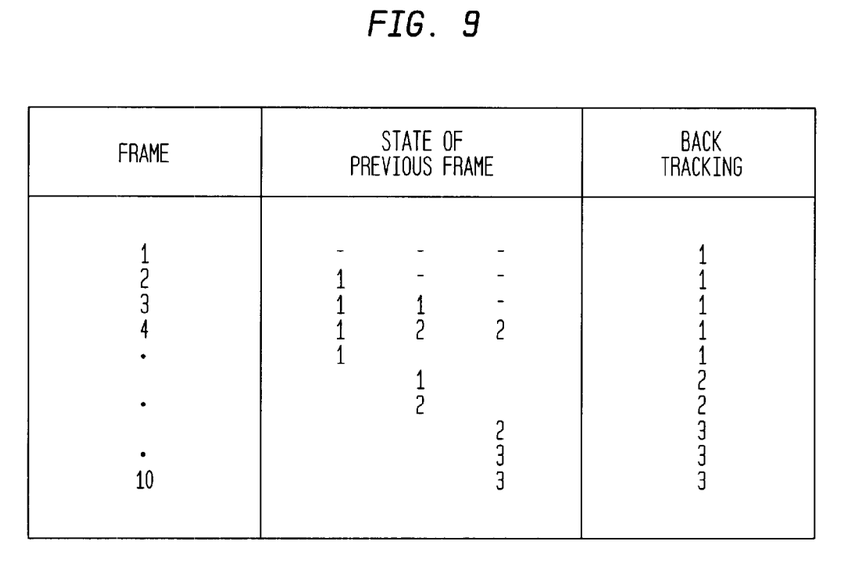
FIG. 9 shows back tracking of states of the Markov chain.

FIG. 9 shows back tracking of states of the Markov model, for simplicity reasons assuming a Markov model having three states, and ten frames, for illustrating retraining of a model. While statistically matching the feature vectors corresponding to the ten frames, for each frame, model state transitions are stored, indicated with "State of Previous Frame" in the second column of the table shown in FIG. 9. After processing of the last feature vector, using stored model state transitions, for each model, back tracking along states of a Markov model is performed, in the given example resulting in a back tracing sequence of states: 1111122333, i.e., the first five feature vectors correspond to state one, followed by two feature vectors corresponding to state two, followed by three feature vectors corresponding to state three. Herewith, for each feature vector it is known which state it should improve in the model. What is aimed at is improving the mean and variance vectors p and a of, e.g., Gaussian probability density distributions. So, in the example given, the first stored feature vectors are used to update state one, the next two stored feature vectors to improve state two, and the last three stored feature vectors to improve state three, i.e., for the model to be retrained, e.g., the model for the utterance "JOHN", mean components in the mean vector $\mu$ become $\frac{1}{5}$, $\frac{1}{2}$, and $\frac{1}{3}$ of the respective means of the vectors $X_1$, $X_2$, $X_3$, $X_4$ and $X_5$, of the vectors $X_6$ and $X_7$, and of the vectors $X_8$, $X_9$ and $X_{10}$, respectively. Corresponding computations may be performed for the variance vector $\sigma$.

Figure 10:
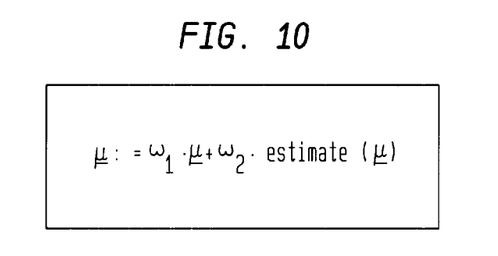
FIG. 10 illustrates weighting of model parameters.

FIG. 10 illustrates weighting of model parameters. In dependence on a user's behavior when the speech recognizer 50 is used in conjunction with an electronic device, such as a mobile radio MS1's name dialer, weighted retraining of a model can be performed. Shown is mean weighting, a mean vector's $\mu$ parameters as stored in the non-volatile memory 25 becoming a weighted mean of the stored mean vector and a weighted mean of and estimate of the mean vector obtained from a current observation of a feature vector: $\mu:=w_1\mu+w_2.\text{estimate}(\mu)$, $w_1$ and $w_2$ being weighting factors. Corresponding weighting may be performed for a variance vector's $\sigma$ parameters. If there exists uncertainty about the obtained transcript IX, i.e., the transcript is not considered very reliable, in the adaptation or retraining process, the stored model's parameters are given a much higher weight than the estimated parameters. Thus, the present invention substantially reduces the likelihood of a model drifting away in a wrong direction as would occur in a typical unsupervised prior system. Updating a model based upon wrong recognition results eventually leads to a situation where correct utterances corresponding to a correctly trained model cannot be recognized anymore. So, if it is clear from the user's behavior when using the speech recognizer that the determined transcript is reliable, updating of a model can be done safely. Otherwise, either strongly weighted updating or no updating at all is performed. Weighting may also depend on the number of utterances previously used for retraining. The weight of the current utterance may be defined as $1/(k+1)$, k being the number of utterances previously used for retraining. But for a large k, e.g., k>10, the weight could be fixed at a low value, e.g., 0.1, so that subsequent utterances do not greatly influence the model anymore, but still have some influence.

Figure 11:
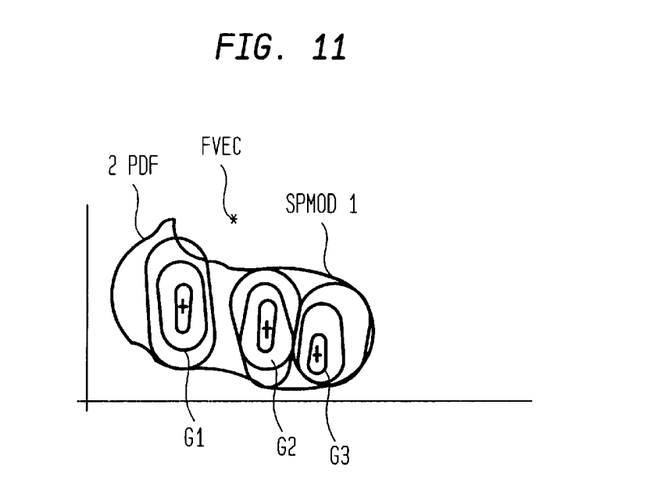
FIG. 11 illustrates a speech model for speaker independent speech recognition.

FIG. 11 illustrates a speech model SPMOD1 for speaker independent speech recognition. The invention can be used in systems for speaker dependent and speaker independent speech recognition. The model SPMOD1 illustrates, in a highly simplified two-dimensional representation, a joint probability distribution JPDF of a mixture of Gaussian distributions G1, G2, and G3, e.g., represented in a very illustrative way, for speakers from the Mid-West, Texas, and the Boston regions of the USA, to be defined for each state of the Markov model for each utterance to be recognized. In reality, it is usually not feasible to associate individual components of the mixture to particular accents in a language. In FIG. 11, a feature vector FVEC is shown. When updating such a joint distribution, the feature vectors which are associated with that state are classified into groups according to the nearest Gaussian distribution so that all feature vectors have the same nearest Gaussian. Then, for each group an estimate is created separately and the estimate is used to update the corresponding Gaussian distribution. The weights in this case may be modified to reflect the relative sizes of the groups.

Figure 12:
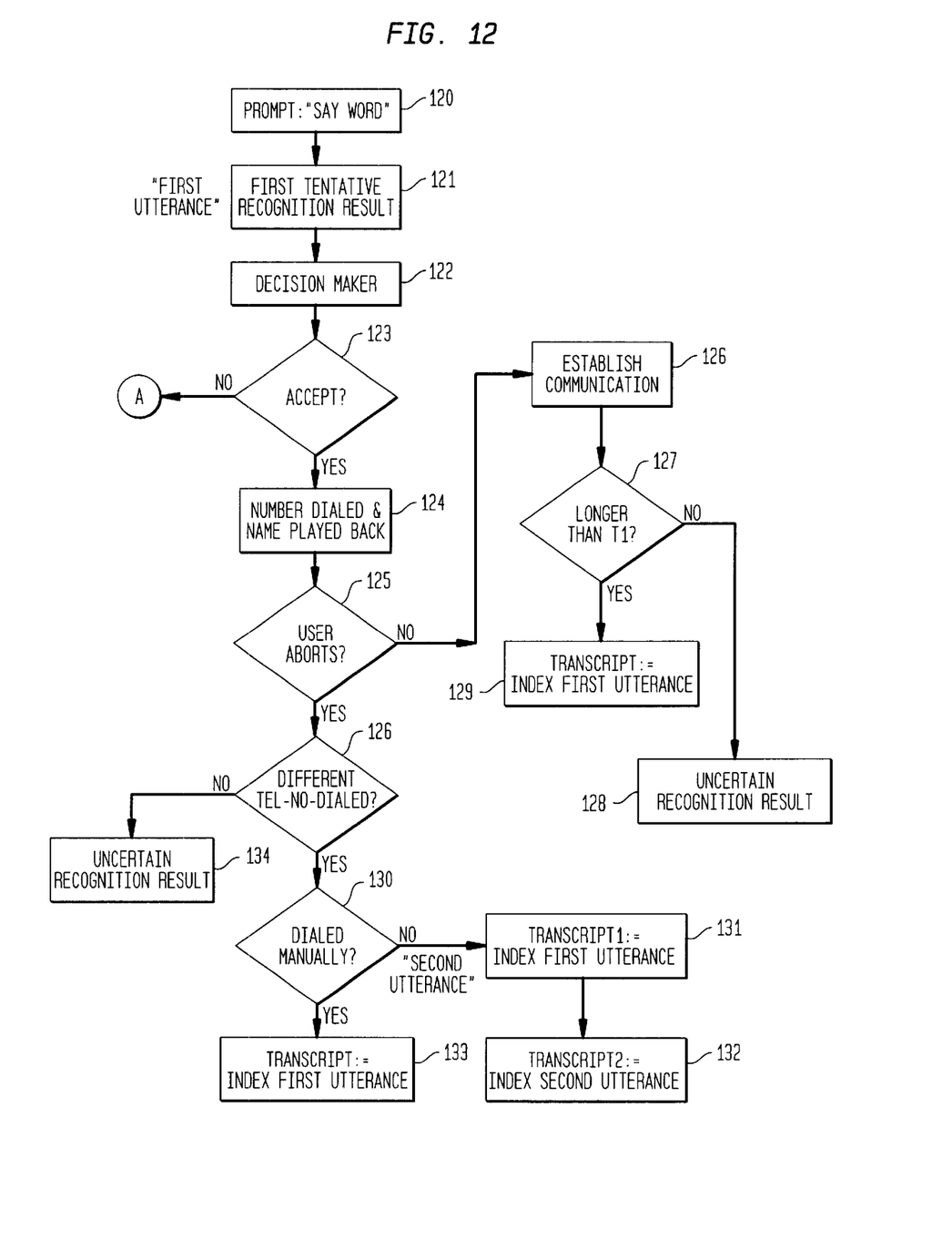
FIG. 12 is a flow chart showing an embodiment of the invention.

FIG. 12 is a flow chart showing an embodiment of the invention. Shown is a process which may be carried out by a suitable stored software program for determination of a reliable transcript according to the invention. In step 120, the user of the telephone dialer incorporated in the mobile telephone MS1 is prompted to say a word to be recognized, after the user has initiated name dialing, by pushing a particular button of the keypad 28. At the same time the analog to digital converter AD is enabled to take speech samples from the speech signal SP_SIGN. In step 121, a first tentative recognition result is determined for a user's first utterance. In step 122, a decision maker 122 either rejects or accepts the first tentative recognition result. Determination of the first tentative recognition result and the decision to reject or to accept the first tentative recognition result is performed within the speech recognizer 50 as described in relation to FIGS. 2–11. At step 123, upon acceptance of the first tentative recognition result, the process proceeds to step 124. Upon rejection, the process proceeds as will be described in conjunction with FIG. 13, indicated with a connector arrow "A". In step 124, a phone number is dialed in correspondence with the index IX as determined by the recognizer. In fact, the dialer could either dial a correct number or a wrong number, depending on the recognition result. In accordance with the invention, depending on the user's successive behavior, it is determined whether a reliable transcript was found or not. Further, in step 124, the dialer plays back the name of the dialed far-end subscriber as found in the directory entry indexed by the index IX, either auditively by playing back a previous stored recording of the far end subscriber's name as stored in the directory NDD, and/or by visual playback on the display 29. In step 125, it is determined whether the user aborts the dialing process or not. If not, the phone has apparently dialed a correctly recognized number, and in step 126, a communication is established between the mobile phone MS1 and the dialed far end subscriber. Establishment of a communication between a mobile phone and a far end subscriber is well-known per se and will not be described in detail here. In step 127, it is tested whether the established communicated lasted longer than a predetermined short period of time T1, i.e., whether the user broke the communication after a short period of time. If broken, the communication might have been established with the wrong far end subscriber. Then, in step 128, it is determined that the tentative recognition result was uncertain. If not broken, in step 129, the index determined in relation to the first utterance is taken and stored in memory as a transcript, to be used in the speech model adaptation phase 42.

When in step 125 it is found that the user has quickly aborted the number dialed in step 124, the number dialed is probably wrong, so the first utterance has been wrongly recognized. Assume, the first utterance was "JOHN", but the recognizer 50 found a different model, because the user pronounced "JOHN" differently from when he was training the model. Then, in fact, it would be most desirable to give the wrongly recognized utterance of "JOHN" a chance in adapting the statistical model corresponding to "JOHN". With future utterances of the user of the name "JOHN", pronounced slightly different than before, e.g., because the user is in a different emotional state, in speaker dependent recognition, or because in a speaker independent system the user is a non-native speaker using a phone trained for native speakers, the speech recognizer 50 would have less difficulty in recognizing the correct utterance. The invention determines a reliable transcript based upon such considerations. In step 126, it is determined whether the user dials a different phone number after first having aborted the dialing process. When applying voice dialing at this second attempt, it is quite likely that the second utterance is the same as the first utterance, say "JOHN". Assume that the phone dialed the wrong name, say "HENRY", from the directory NDD, corresponding to a wrongly recognized speech dialed name "JOHN". Assume that the user indeed speech dialed "JOHN" in a second attempt. Then, if it is determined in step 130 that the second attempt was not done while applying manual dialing, in step 131, a first transcript TRANSCRIPT1 is stored for later updating the model "JOHN", and optionally, also a second transcript is stored for "JOHN". If in step 130 it is determined that at the second attempt the number had been dialed manually, in step 132, the index corresponding to the first utterance is stored as a reliable transcript. Also in this situation, in step 133, the apparently wrongly recognized first utterance but otherwise correct utterance "JOHN" is given a chance to update the model for "JOHN". If in step 126 it is determined that no different phone number has been dialed, it is determined in step 134 that the recognition result was uncertain and no transcript is stored.

Figure 13:
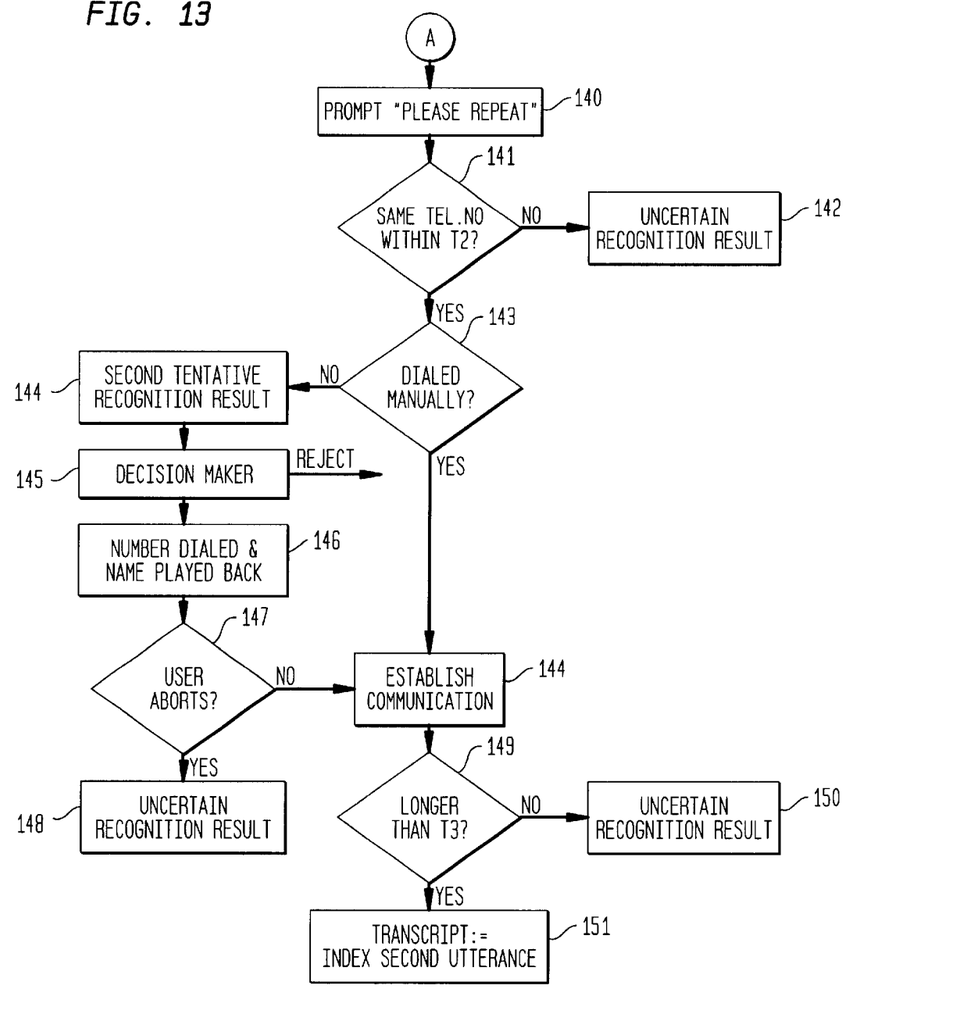
FIG. 13 is a flow chart illustrating a further embodiment of the invention.

FIG. 13 is a flow chart illustrating a further embodiment of the invention. The flow chart connector "A" in FIG. 13 connects to the flow chart connector "A" in FIG. 12. Shown is a further process for determination of a reliable transcript upon rejection of the first utterance as described in conjunction with FIG. 12. After rejection of the first tentative recognition result, in step 140, the mobile phone MS1 prompts the user to repeat its first utterance. It is then determined in step 141 whether the user dials the same phone number, within a short period of time T2. If not, in step 142 it is determined that the first tentative recognition result, that had been stored in memory, is an uncertain recognition result not to be used as a reliable transcript. If yes is the result in step 143, it is further determined whether the user had dialed the phone number manually. If so, in step 144, communication is established with the far end subscriber of the dialed phone number. If not, in step 144, first the speech recognizer 50 determines a second tentative recognition result, and then, in step 145, the decision maker 55 either rejects or accepts the second tentative recognition result. If accepted, in step 146, the mobile phone MS1 dials a phone number from the name dialing directory NDD indexed by the second tentative recognition result, of which also the corresponding feature vector and model state transitions are stored, and plays back the recorded name as stored in the relevant entry of the name dialing directory NDD. Then, in step 147, it is tested whether the user aborts the dialing process or not. If so, in step 148, it is determined that both the first and the second recognition results were uncertain and are not to be used as a reliable transcript. If not, the process proceeds in step 144 to establish communication. In step 149, it is tested whether the user broke the communication link within a short period of time T3. If so, in step 150, it is determined that the first and second tentative recognition results were uncertain and are not to be used as a reliable transcript. If not, in step 151, the index corresponding to the first utterance is stored as a reliable transcript, and, optionally, the index corresponding to the second utterance. Consequently, an improperly rejected recognition still gets a chance to update the corresponding correct model. Herewith, it is achieved that the model is retrained to also recognize utterances of a user of the same word not having been used when training the model, and so overall improvement of the speech recognition process is obtained.

Figure 14:
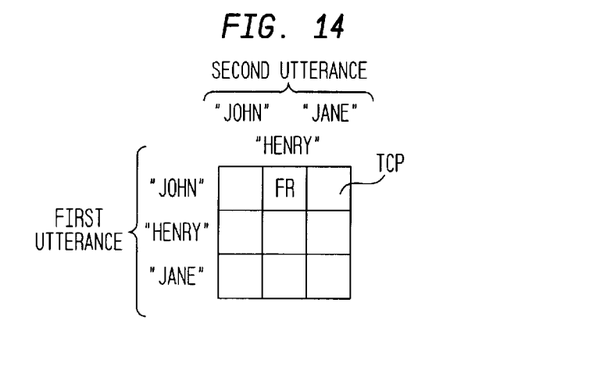
FIG. 14 illustrates a further embodiment of the invention.

FIG. 14 shows a further variation of the invention in which recognition errors are kept track of in a situation where the user aborted the dialing upon recognition of the first utterance not because of an incorrect recognition result but because the user changed his mind and simply decided to call another person. Shown is a table in memory TCP, a table of statistically confusable pairs, e.g., for first and second utterance "JOHN", "HENRY", and "JANE", in which frequencies of occurrence of confusable pairs are recorded. Adaptation is postponed here. Adaptation of the model is only done if the recognized model and the model corresponding to the subsequently dialed number form a confusable pair. Herewith, the overall speech recognition process is improved. Also, in this situation, after the second dialing, the user could be prompted to confirm that the second number as dialed is the same as the one the user previously has tried to dial by voice. In order not to make it an imposition, the user should not be forced to reply to this prompt. The request could be worded like: "If this is the same number you previously tried to voice-dial, you may press the SEND twice", SEND being a button on the keypad 28.

In the name dialing directory NDD, anti-models may also be stored and adapted. An anti-model is a model which is statistically confusable with a particular model corresponding to a pronounceable transcript to be recognized. Typically, such an anti-model is not pronounceable. Particularly, if a recognition result is erroneous, i.e., it differs from a transcript of a model, then the stored feature vector may be used to adapt the anti-model corresponding to the recognition result.

In view of the foregoing, it will be evident to a person skilled in the art that various modifications may be made within the spirit and the scope of the invention as hereinafter defined by the appended claims and that the invention is thus not limited to the examples provided. The invention has been disclosed in a presently preferred context, but can generally be applied to voice control of any electronic device or system. Further, in case of a system such as the phone system, the speech recognizer may also be located in the network.

What is claimed is:

1. A method for automatic retraining of a speech recognizer during its normal operation, in which speech recognizer a plurality of trained models is stored, the method comprising:
   a) extracting a first feature vector sequence from a sampled input stream of a first user utterance,
   b) statistically matching the first feature vector sequence with the stored models so as to obtain likelihood scores for each model, while storing model state transitions,
   c) identifying the model with the highest likelihood score as a first tentative recognition result,
   d) storing the first feature vector sequence and the first tentative recognition result,
   e) informing the user, upon acceptance of the first tentative recognition result, about the first tentative recognition result,
   f) determining from the user's behavior, when the user successively operates the speech recognizer, whether the first tentative recognition result was correct, and
   g) retraining a model corresponding to the first recognition result, using the stored first feature vector sequence, if the first tentative recognition result was correct.

2. The method of claim 1, further comprising, if it was determined that the first tentative recognition result was not correct, retraining of another model corresponding to a second recognition result if the user inputs a second utterance of which a second tentative recognition result differs from the first tentative recognition result, whereby the second tentative recognition result is determined in correspondence with steps a) to d) of claim 1, rather than retraining the model corresponding to the second tentative recognition result.

3. The method of claim 2, further comprising, upon retraining of said retraining of another model, retraining of the model corresponding to the second tentative recognition result, retraining being performed on the basis of a second stored feature vector sequence, which is obtained from the second utterance, and back tracking information obtained from the stored model state transitions.

4. The method of claim 2, for use with the speech recognizer coupled to an electronic device responsive to a recognized user utterance of the speech recognizer, further comprising refraining from updating a model if a response from the electronic device to the recognized user utterance is interrupted by the user within a predetermined period of time.

5. The method of claim 1, for use with the speech recognizer coupled to an electronic device responsive to a recognized user utterance of the speech recognizer, further comprising refraining from updating a model if a response from the electronic device to the recognized user utterance is interrupted by the user within a predetermined period of time.

6. The method of claim 1, further comprising weighted retraining of the model, a first weighting factor being applied to stored model parameters and a second weighting factor being applied to an estimate of the model parameters obtained from the first or second tentative recognition result.

7. The method of claim 6, further comprising requesting the user to confirm whether the first user utterance is the same as the second user utterance, and refraining from retraining if the user indicates that the second user utterance differs from the first user utterance.

8. A method for automatic retraining of a speech recognizer during its normal operation, in which speech recognizer a plurality of trained models is stored, the method comprising:
 a) extracting a first feature vector sequence from a sampled input stream of a first user utterance,
 b) statistically matching the first feature vector sequence with the stored models so as to obtain likelihood scores for each model, while storing model state transitions,
 c) identifying the model with the highest likelihood score as a first tentative recognition result,
 d) storing the first feature vector sequence and the first tentative recognition result,
 e) informing the user, upon acceptance of the first tentative recognition result, about the first tentative recognition result, and
 f) upon rejection of the first tentative recognition result, prompting the user to input a second utterance, of the same transcript as the first utterance, of which second utterance a second tentative recognition result is different from the first tentative recognition result, whereby the second tentative recognition result is determined in correspondence with steps a) to d), and retraining the model corresponding to the second tentative recognition result, rather than retraining the model corresponding to the first tentative recognition result, retraining being performed on the basis of the stored first feature vector sequence and back tracking information obtained from the stored model state transitions.

9. The method of claim 8, for use with the speech recognizer coupled to an electronic device responsive to a recognized user utterance of the speech recognizer, further comprising refraining from updating a model if a response from the electronic device to the recognized user utterance is interrupted by the user within a predetermined period of time.

10. A voice operated system comprising a speech recognizer to be retrained during its normal operation, in which speech recognizer a plurality of trained models is stored, and an electronic device responsive to a recognized utterance of the user, the speech recognizer comprising:
 a) means for extracting a first feature vector sequence from a sampled input stream of a first user utterance,
 b) means for statistically matching the first feature vector sequence with the stored models so as to obtain likelihood scores for each model, while storing model state transitions,
 c) means for identifying the model with the highest likelihood score as a first tentative recognition result,
 d) means for storing the first feature vector sequence and the first tentative recognition result,
 e) means for informing the user, upon acceptance of the first tentative recognition result, about the first tentative recognition result,
 f) means for determining from the user's behavior, when the user successively operates the speech recognizer, whether the first tentative recognition result was correct, and
 g) means for retraining a model corresponding to the first tentative recognition, using the stored first feature vector sequence, retraining being performed if it was determined that the first recognition result was correct.

11. The system of claim 10, further comprising, if it was determined that the first tentative recognition result was not correct, means for retraining of another model corresponding to a second recognition result if the user inputs a second utterance of which a second tentative recognition result differs from the first tentative recognition result, whereby the second tentative recognition result is determined in correspondence with steps a) to d) of claim 10, rather than retraining the model corresponding to the second tentative recognition result.

12. The system of claim 11, further comprising, upon retraining of said retraining of another model, means for retraining the model corresponding to the second tentative recognition result, retraining being performed on the basis of a second stored feature vector sequence, which is obtained from the second utterance, and back tracking information obtained from the stored model state transitions.

13. The system of claim 11, wherein the speech recognizer further comprises means for refraining from updating a model if a response from the electronic device to the recognized user utterance is interrupted by the user within a predetermined period of time.

14. The system of claim 10, wherein the speech recognizer further comprises means for refraining from updating a model if a response from the electronic device to the recognized user utterance is interrupted by the user within a predetermined period of time.

15. The system of claim 10, wherein the speech recognizer further comprises means for weighted retraining of the model, a first weighting factor being applied to stored model parameters and a second weighting factor being applied to an estimate of the model parameters obtained from the first or second tentative recognition result.

16. The system of claim 15, further comprising means for requesting the user to confirm whether the first user utterance is the same as the second user utterance, the speech recognizer comprising means for refraining from retraining if the user indicates that the second user utterance differs from the first user utterance.

17. The system of claim 10, wherein said system is comprised of an arrangement comprising both the speech recognizer and the electronic device responsive to the speech recognizer.

18. The system of claim 17, wherein the arrangement is a communication device.

19. The system of claim 10, wherein the arrangement is a communication device.

20. The system of claim 10, wherein system is further comprised of a telephone network and a plurality of telephone apparatuses, the speech recognizer being comprised in the network and the electronic device being a telephone apparatus, whereby the user is an operator of the electronic device capable of communicating by speech with the speech recognizer.

21. A voice operated system comprising an speech recognizer to be retrained during its normal operation and an electronic device responsive to a recognized user utterance of a user of the system, in which speech recognizer a plurality of trained models is stored, and an electronic device responsive to a recognized utterance of the user, the speech recognizer comprising:

a) means for extracting a first feature vector sequence from a sampled input stream of a first user utterance, b) means for statistically matching the first feature vector sequence with the stored models so as to obtain likelihood scores for each model, while storing model state transitions, c) means for identifying the model with the highest likelihood score as a first tentative recognition result, d) means for storing the first feature vector sequence and the first tentative recognition result, e) means for informing the user, upon acceptance of the first tentative recognition result, about the first tentative recognition result, and f) upon rejection of the first tentative recognition result, means for prompting the user to input a second utterance, of the same transcript as the first utterance, of which second utterance a second tentative recognition result is different from the first tentative recognition result, whereby the second tentative recognition result is determined in correspondence with steps a) to d), and means for retraining the model corresponding to the second tentative recognition result, rather than retraining the model corresponding to the first tentative recognition result, retraining being performed on the basis of the stored first feature vector sequence and back tracking information obtained from the stored model state transitions.

22. The system of claim 21, further comprising means for refraining from updating a model if a response from the electronic device to the recognized user utterance is interrupted by the user within a predetermined period of time.

23. The system of claim 21, wherein said system is comprised of an arrangement comprising both the speech recognizer and the electronic device responsive to the speech recognizer.

24. The system of claim 21, wherein said system is comprised of a telephone network and a plurality of telephone apparatuses, the speech recognizer being comprised in the network and the electronic device being a telephone apparatus, whereby the user an operator of the electronic device capable of communicating with the speech recognizer.

* * * * *